United States Patent
Haberstock et al.

(10) Patent No.: US 11,988,277 B2
(45) Date of Patent: May 21, 2024

(54) HYDRAULIC SYSTEM FOR A TRANSMISSION OF A MOTOR VEHICLE

(71) Applicant: ZF Friedrichshafen AG, Friedrichshafen (DE)

(72) Inventors: Alexander Haberstock, Ravensburg (DE); Thilo Schmidt, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/297,287

(22) Filed: Apr. 7, 2023

(65) Prior Publication Data
US 2023/0323944 A1    Oct. 12, 2023

(30) Foreign Application Priority Data

Apr. 8, 2022   (DE) .................... 10 2022 203 576.3

(51) Int. Cl.
*F16H 61/00*     (2006.01)
*F16H 61/02*     (2006.01)

(52) U.S. Cl.
CPC ..... *F16H 61/0009* (2013.01); *F16H 61/0025* (2013.01); *F16H 61/0206* (2013.01); *F16H 2061/0253* (2013.01); *F16H 61/0267* (2013.01)

(58) Field of Classification Search
CPC ............ F16H 61/0009; F16H 61/0025; F16H 61/0206; F16H 61/0267; F16H 2061/0253
See application file for complete search history.

(56) References Cited

U.S. PATENT DOCUMENTS

| | | | |
|---|---|---|---|
| 6,666,225 B2 | 12/2003 | Kemmner et al. | |
| 10,794,468 B2 | 10/2020 | Herrmann et al. | |
| 11,022,155 B2 | 6/2021 | Spangler | |
| 2005/0263352 A1 | 12/2005 | Fideler et al. | |
| 2018/0045302 A1* | 2/2018 | Schultz | F16K 15/04 |

(Continued)

FOREIGN PATENT DOCUMENTS

| | | |
|---|---|---|
| DE | 10041386 A1 | 3/2002 |
| DE | 102004025764 A1 | 5/2006 |

(Continued)

OTHER PUBLICATIONS

German Search Report DE 10 2022 203 576.3, dated Nov. 25, 2022. (12 pages).

*Primary Examiner* — Justin Holmes
(74) *Attorney, Agent, or Firm* — Dority & Manning, P.A.

(57) ABSTRACT

A hydraulic system (1) for a transmission (2) of a motor vehicle (3) includes a pump system (5) with a first pressure outlet (6) and a second pressure outlet (7), a primary circuit (11), a secondary circuit (12), and a system pressure valve (8) that has a system pressure valve slide (9). A secondary pump pressure ($P_{Psek}$) output from the second pressure outlet (7) of the pump system (5) is fed to a radial pressure surface (26) of the system pressure valve slide (9), and therefore an axial load based on the secondary pump pressure ($P_{Psek}$) acts upon the radial pressure surface (26) of the system pressure valve slide (9) such that the system pressure valve slide (9) tends to move counter to a mechanical preload force out of a first switching position into a second switching position.

12 Claims, 4 Drawing Sheets

(56) References Cited

U.S. PATENT DOCUMENTS

2020/0309159 A1* 10/2020 Haberstock ......... F16H 61/0021
2021/0404564 A1   12/2021 Haberstock et al.

FOREIGN PATENT DOCUMENTS

| DE | 102013114283 A1 * | 3/2015 | ......... F16H 61/0021 |
|----|-------------------|--------|------------------------|
| DE | 102016204399 A1   | 9/2017 |                        |
| DE | 102018127326 A1   | 5/2019 |                        |
| DE | 102018219113 A1   | 5/2020 |                        |

* cited by examiner

HYDRAULIC SYSTEM FOR A TRANSMISSION OF A MOTOR VEHICLE

CROSS-REFERENCE TO RELATED APPLICATIONS

The present application is related and claims priority to 102022203576.3 filed in the German Patent Office on Apr. 8, 2022, which is incorporated by reference in its entirety for all purposes.

FIELD OF THE INVENTION

The invention relates generally to a hydraulic system for a transmission of a motor vehicle.

BACKGROUND

Hydraulic control units in automatic transmissions of motor vehicles are typically subdivided into three circuits, which are operated in order of priority. A primary circuit is used to supply shift elements (clutches/brakes) of the automatic transmission, a secondary circuit is used for cooling and lubrication, and a tertiary circuit is used to return an excess amount of oil to a pump system of the automatic transmission (suction charging). In the primary circuit there is usually high pressure at a low volumetric flow rate (in the absence of gear shifts) and in the secondary circuit there is low pressure at a high volumetric flow rate (for cooling/lubrication). The tertiary circuit has no direct requirements. Instead, the tertiary circuit is supplied by the excess amount (depending on the pump flow rate) that is not needed by the primary circuit or by the secondary circuit. The task of determining which circuit is supplied first is carried out by a system pressure valve (pressure control valve) of the automatic transmission. The oil supply is made available via the pump system, which typically delivers a volumetric flow rate that is proportional to an input speed of the automatic transmission. In order to reduce power consumption (pressure multiplied by volumetric flow rate) and therefore also the energy demand of the pump system, a dual circuit pump system is used in modern automatic transmissions. The dual circuit pump system frequently includes a double-stroke vane pump. In such systems, the pressure in a flow (secondary flow) is reduced to a lower level (approximately zero (0) bar is also possible), as a result of which the input torque and, thus, wear are reduced.

The great advantage of the dual circuit pump system is that, in situations in which a high volumetric flow rate is required in the primary circuit (for example, during a gear shift), the pressure in the secondary flow can be increased to the primary pressure in order to make the volumetric flow rate of the secondary flow available to the primary circuit. Therefore, the overall displacement of the pump system can be used to improve the supply and to reduce pressure drops. The connection of the secondary flow is controlled by an open-loop system via a self-regulating hydraulic system, which is made up of two valves (a system pressure valve and a lubricating valve) and connects the secondary flow when the primary circuit is undersaturated. The demand in the primary circuit is made up of the basic leakage, which is caused by a valve gap (and mainly dependent on pressure and temperature), and a gear shift demand for filling a shift element. In this context, DE 10 2004 025 764 A1 describes a hydraulic circuit for supplying oil to an automatic transmission for motor vehicles. The hydraulic circuit includes a low pressure circuit for conveying a first volumetric flow rate at a first pressure level and a high pressure circuit for conveying a second volumetric flow rate at a second, higher pressure level. The first pressure level of the first volumetric flow rate is modulatable onto the higher pressure level if necessary and both volumetric flow rates are summable when at the same pressure level.

In a self-regulating hydraulic system, conditions can arise at the switch-over point of the secondary pump pressure (the point is dependent on rotational speed, temperature, pressure, oil demand), in which the hydraulic system is unsteady and high pressure and low pressure oscillate. This "toggling" causes the high pressure to oscillate, and the engaged clutches may no longer be able to transmit their torque, as a result of which the ride comfort can deteriorate. Options for attenuating the system pressure valve and, as a result, reducing the oscillations are possible only to a limited extent, since good dynamics of the system pressure valve are simultaneously required in order to quickly carry out pressure increases. Therefore, the orifices at the valve cannot be selected to be arbitrarily small (better damping).

SUMMARY OF THE INVENTION

Example aspects of the present invention provide a hydraulic system that is less susceptible to the aforementioned oscillations when the secondary pump pressure is switched over.

According to example aspects of the present invention, it is provided, in a hydraulic system of an automotive automatic transmission, to apply a secondary output pressure of a pump system to a system pressure valve such that oscillations within the hydraulic system are limited, avoided or reduced. The secondary output pressure of the pump system is used as a control parameter and, for example, returned onto an end-face surface of a piston of a valve slide of the system pressure valve. This return can take place, for example, via different sized diameters of pistons of the system pressure valve slide that are positioned opposite one another. Alternatively, differently designed hydraulic pressure splitter circuits can be provided, by which the aforementioned return can be carried out.

In this sense, example aspects of the invention provide a hydraulic system for a transmission of a motor vehicle. The hydraulic system has a pump system that includes a first pressure outlet and a second pressure outlet. In addition, the hydraulic system has a primary circuit, a secondary circuit, and a system pressure valve with a system pressure valve slide. A secondary pump pressure output from the second pressure outlet of the pump system is fed to a radial pressure surface of the system pressure valve slide, and therefore an axial load based on the secondary pump pressure acts upon the radial pressure surface of the system pressure valve slide such that the system pressure valve slide tends to move counter to a mechanical preload force out of a first switching position into a second switching position.

When the system pressure valve slide is in the first switching position, hydraulic fluid pumped from the pump system via the two pressure outlets of the pump system can then be directed via the system pressure valve exclusively into the primary circuit, and therefore a first primary system pressure prevails in the primary circuit. When the system pressure valve slide is in the second switching position, hydraulic fluid pumped from the pump system via the first two pressure outlets of the pump system can be directed, on the one hand, via the system pressure valve into the primary circuit and, on the other hand, in order to reduce the primary system pressure, a portion of the hydraulic fluid pumped from the pump system via the second pressure outlet of the pump system can be directed via the system pressure valve into the secondary circuit. In this way, pressure can be released from the system pressure line into the lube oil line.

In one example embodiment, the hydraulic system also has a pilot valve that includes an electromagnetically actuated actuator, wherein a pressure inlet of the pilot valve is connected to the system pressure line. The pilot valve outputs a hydraulic pilot pressure. The pilot pressure results in a hydraulic pilot force, which acts upon the system pressure valve slide in the same direction as the mechanical preload force such that the hydraulic pilot force boosts the mechanical preload force.

In order to reduce the susceptibility of the system to toggling, the information regarding the saturation condition in the form of the secondary pump pressure can be switched onto a surface ("differential area") of the system pressure valve. Due to the feedback of the secondary pressure onto the differential area, the axial load on the system pressure valve slide is increased when the secondary flow is acted upon by high pressure. When the pressure is lowered to low pressure, the axial load is reduced. This dependence leads to a stabilization of the system. In this sense, it is provided according to one example embodiment that the system pressure valve slide has two adjacent pistons having different diameters, wherein the pistons are spaced apart from each other in an axial direction of the system pressure valve slide. The piston that has the greater diameter forms the radial pressure surface of the system pressure valve slide. The axial load based on the secondary pump pressure acts upon the radial pressure surface of the piston having the greater diameter such that the system pressure valve slide tends to move counter to the mechanical preload force out of the first switching position into the second switching position. The piston that has the greater diameter is preferably arranged, in an axial direction of the system pressure valve, with a smaller distance to a spring, which generates the mechanical preload force. The diameter of the larger piston is, for example, maximally a tenth of a millimeter (0.1 mm) larger than the counteracting smaller diameter of the other piston. The difference between the diameters can be designed, however, according to the desired intensity of the effect.

Instead of enlarging one of the two diameters of the above-described pistons, the secondary pump pressure can be conducted via a hydraulic pressure splitter circuit more particularly onto a radial end face of the system pressure valve slide. The intensity of the effect can be set via a ratio of orifice diameters. In this sense, it is provided according to one example embodiment that the axial load based on the secondary pump pressure is conducted via a first hydraulic pressure splitter circuit onto the radial pressure surface of the system pressure valve slide. In this context, it can be provided, more particularly, that the hydraulic pressure splitter circuit has two pressure splitter lines, within each of which a pressure splitter orifice is arranged, wherein the secondary pump pressure is reduced by the hydraulic pressure splitter circuit. The reduced secondary pump pressure then acts upon the radial pressure surface, which is formed, more particularly, by a piston of the system pressure valve slide arranged on the end face. Moreover, one of the two pressure lines can be connected, on the one hand, to a pressureless tank and, on the other hand, to a pressure inlet of the system pressure valve, wherein the radial pressure surface is acted upon by the reduced secondary pump pressure via the pressure inlet of the system pressure valve. This example embodiment avoids high costs, which, for fabrication reasons, can be associated with the above-described embodiment having different piston diameters, since it is very costly to respect the tolerances. Example embodiments that include the alternative pressure splitter circuit reduce the susceptibility of the hydraulic system to toggling in the same way as the example embodiment having different sized piston diameters.

The dependence of the secondary pump pressure on the axial load at the system pressure valve slide can also be achieved by reducing a return pressure of the primary circuit as soon as the secondary pump pressure has dropped to low pressure. More particularly, an alternative pressure splitter can be used for this purpose. The advantage of this example embodiment is that a leakage arises only when the secondary pump pressure has been reduced to low pressure (before this, both circuits were at high pressure). Thereafter, the oil does not flow into a tank. Instead, the oil can be fed to the secondary circuit. As a result, the oil is not lost unused. In this sense, it is provided according to one example embodiment that the axial load is based on the secondary pump pressure and on a primary pump pressure, wherein the secondary pump pressure and the primary pump pressure are reduced by a second hydraulic pressure splitter circuit to a common feedback pressure, which is applied to the radial pressure surface of the system pressure valve slide.

In this context, the hydraulic pressure splitter circuit can have a first pressure splitter line, which is connected to the first pressure outlet of the pump system and within which a first pressure splitter orifice is arranged, wherein the hydraulic pressure splitter circuit has a second pressure splitter line, which is connected to the second pressure outlet of the pump system and within which a second pressure splitter orifice is arranged. The hydraulic pressure splitter circuit has a third pressure splitter line, which is connected to the first pressure splitter line and to the second pressure splitter line and within which a third pressure splitter orifice is arranged. The third pressure splitter line is connected to a pressure inlet of the system pressure valve, wherein the radial pressure surface, more particularly, is formed by a piston of the system pressure valve slide arranged on the end face and is acted upon by the reduced common feedback pressure via the pressure inlet of the system pressure valve.

BRIEF DESCRIPTION OF THE DRAWINGS

Exemplary embodiments of the invention are explained in greater detail in the following with reference to the schematic drawings, wherein identical or similar elements are labeled with the same reference character, wherein.

DETAILED DESCRIPTION

Figure 1:
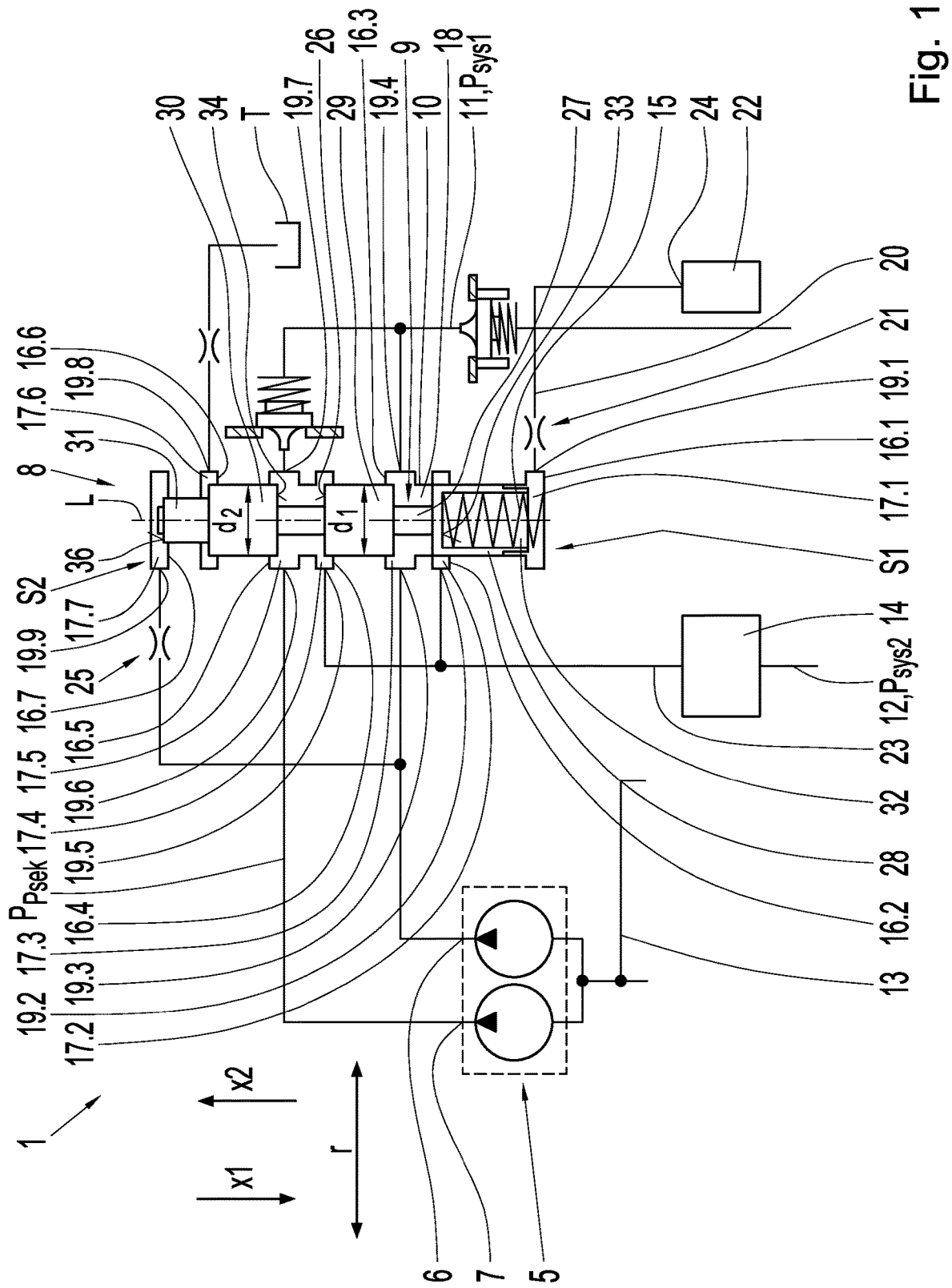
FIG. 1 shows a hydraulic circuit diagram of a first exemplary embodiment of a hydraulic system according to example aspects of the invention for an automatic transmission of a motor vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 2:
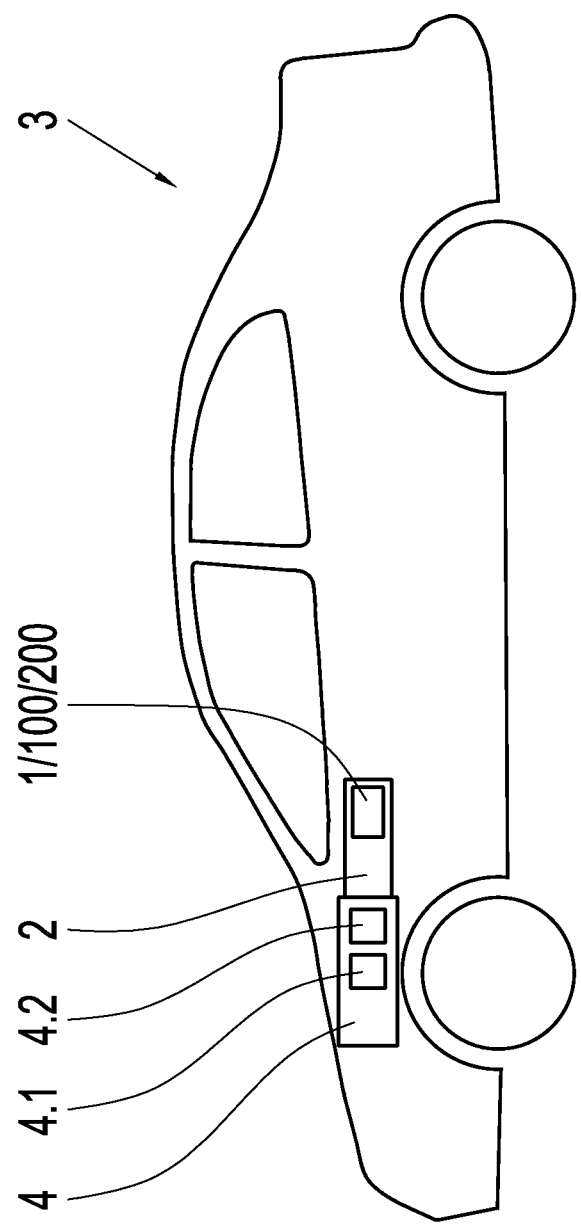
FIG. 2 shows a side view of a motor vehicle with an automatic transmission, which includes a hydraulic system from FIG. 1 or 3 or 4.

FIG. 1 shows a hydraulic system 1, which can be used in an automatic transmission 2 of a motor vehicle 3 shown in FIG. 2. The motor vehicle 3 has at least one prime mover 4, which drives the motor vehicle 3 via the automatic transmission 2. The motor vehicle shown can be, for example, a hybrid vehicle, which can be driven by an internal combustion engine 4.1 and/or by an electric machine 4.2. Alternatively, however, only the internal combustion engine 4.1 or the electric machine 4.2 can be provided for driving the motor vehicle 3.

FIG. 1 shows only a portion of the entire hydraulic system, which is designed to actuate multiple shift elements (brakes and/or clutches; not shown) of the automatic transmission 2. The hydraulic system 1 includes, more particularly, a pump system 5 having a first pressure outlet 6 and having a second pressure outlet 7. The hydraulic system 1 also includes a system pressure valve 8 having a system pressure valve slide 9 and having a valve housing 10. The hydraulic system 1 also has a primary circuit 11 and a secondary circuit 12.

The primary circuit 11 is used to supply the shift elements (clutches/brakes) of the automatic transmission 2 with a pressurized hydraulic fluid (oil in the exemplary embodiment shown), whereas the secondary circuit 12 is used to cool and lubricate the automatic transmission 2 by the hydraulic fluid. A tertiary circuit 13 of the hydraulic system 1 is used to return an excess amount of the hydraulic fluid to the pump system 5 of the automatic transmission 2 (suction charging). A higher pressure at a lower volumetric flow rate (in the absence of gear shifts) prevails in the primary circuit 11 in comparison to the secondary circuit 12, within which a lower pressure at a higher volumetric flow rate prevails (for cooling/lubrication). The tertiary circuit 13 has no direct requirements. Instead, the tertiary circuit 13 is supplied by the excess amount (depending on the pump flow rate) of the hydraulic fluid that is not needed by the primary circuit 11 or by the secondary circuit 12. The open-loop control regarding which of the two circuits 11, 12 is supplied first is carried out by the system pressure valve 8, which is designed as a pressure control valve. The exemplary embodiments are described in the following in conjunction with oil as the hydraulic fluid, wherein other hydraulic fluids can also be similarly used, however.

The oil supply is made available via the pump system 5, which delivers a volumetric flow rate that is proportional to an input speed of the automatic transmission 2. In order to reduce power consumption (pressure multiplied by volumetric flow rate) and therefore also the energy demand of the pump system 5, a dual circuit pump system is used, which is in the form of a double-stroke vane pump in the exemplary embodiment shown. One example of a suitable double-stroke vane pump is known, for example, from DE 10 2016 218 186 A1 (cf., more particularly here, FIGS. 2 through 4) of the applicant, which is incorporated by reference in its entirety for all purposes. Coupled via an input shaft of the automatic transmission 2, the pump system 5 can be mechanically driven by the internal combustion engine 4.1 and/or by the electric machine 4.2 of the hybrid drive of the motor vehicle 3. Alternatively or additionally, the pump system 5 can be optionally actuated or driven under electric motor power via an electric motor provided specifically for the pump system 5.

In the case of the double-stroke vane pump 5, the pressure in a flow (secondary flow; output via the second pressure outlet) can be reduced to a lower level (approximately zero (0) bar is also possible), as a result of which the input torque and, thus, wear are reduced. A great advantage of the dual circuit pump system 5 is that, in situations in which a high volumetric flow rate is required in the primary circuit 11 (for example, during a gear shift of one or more of the shift elements of the automatic transmission 2), the pressure in the secondary flow can be increased to a primary pressure, which is provided by the primary flow, in order to make the volumetric flow rate of the secondary flow available to the primary circuit. Therefore, the overall displacement of the pump system 5 can be used to improve the supply and to reduce pressure drops.

The connection of the secondary flow is controlled via a self-regulating hydraulic subsystem, which includes the system pressure valve 8 and a lubricating valve 14 (shown merely schematically in the drawing without ports or the like) and connects the secondary flow when the primary circuit 11 is undersaturated. The secondary flow is connected by connecting the second pressure outlet 7 of the pump system 5 to the primary circuit 11 via the system pressure valve 8, which is achieved by positions of the system pressure valve slide 9 that are suitable for this purpose. The amount of oil required and the pressure requirement within the primary circuit 11 are made up of the basic leakage, caused by a valve gap (and mainly dependent on pressure and temperature), and a gear shift demand for filling a shift element.

In the self-regulating hydraulic subsystem (system pressure valve 8 and lubricating valve 14), conditions can arise at the switch-over point of the second pressure outlet 7 of the pump system 5 (the point is dependent on rotational speed, temperature, pressure, oil demand), in which the hydraulic system 2 behaves in an unsteady manner and high pressure and low pressure oscillate. This "toggling" leads to all areas of the hydraulic system 1 in which high pressure prevails (more particularly the primary circuit 11) being excited to very high vibration, and the engaged shift elements (more particularly clutches) may no longer be able to transmit their torque, as a result of which the ride comfort of the motor vehicle 1 can deteriorate.

In order to reduce the susceptibility of the hydraulic system 1 to the above-described toggling, in the exemplary embodiment according to FIG. 1, the information regarding the saturation condition in the form of the secondary pump pressure is switched onto an area ("differential area") of the system pressure valve 8. Due to the feedback of the secondary pressure, which is output via the second pressure outlet 7 of the pump system 5, onto the differential area, an axial load upon the system pressure valve slide 9 of the system pressure valve 8 is increased when the secondary flow is acted upon by high pressure. When the secondary flow is reduced to low pressure, the axial load upon the system pressure valve slide 9 is reduced. This dependence results in a stabilization of the hydraulic system 1. The differential area is achieved by a size difference of two adjacent pistons of the system pressure valve slide 9, which is described in greater detail in the following in conjunction with the design of the system pressure valve 8.

The system pressure valve 8 is a directional valve, which includes, more particularly, the valve housing 10 and the system pressure valve slide 9. The system pressure valve slide 9 can be displaced back and forth within the valve housing 10 in opposite axial directions x1 (first direction) and x2 (second direction) along a longitudinal axis L of the system pressure valve 6. The system pressure valve slide 9 is preloaded in a first switching position by a restoring element in the form of a spring element 15. The spring element 15 is arranged in the area of a first end face S1 of the system pressure valve 8.

The system pressure valve 8 has seven valve collars 16.1 through 16.7 arranged at a distance to one another along the longitudinal axis L. The valve collars 16.1 through 16.7 can be formed by the valve housing 10. The valve collars 16.1 through 16.7 are hollow inside, extend more particularly three hundred and sixty degrees (360°) around the edge, and form a valve pocket 17.1 through 17.7, respectively, each of which extends further outwards in a radial direction r of the system pressure valve 8 than a longitudinal bore 18 of the valve housing 8 extending in the longitudinal direction L of the system pressure valve 8. The valve housing 10 also has at least one port in the area of each of the valve pockets 17.1 through 17.7, each port being connected to one of the valve pockets 17.1 through 17.7.

The first valve collar 16.1, the first valve pocket 17.1, and a first port 19.1 are arranged in the area of the first end face S1. The first port 19.1 is a pressure inlet and, in the exemplary embodiment shown, is connected to a pressure outlet 24 of a pilot valve 22 via a pilot pressure line 20 and a pilot pressure orifice 21.

Adjacent thereto and spaced apart therefrom in the second direction x2 are the second valve collar 16.2, the second valve pocket 17.2 and a second port 19.2. The second port 19.2 is a pressure outlet and is connected to a lube oil line 23. The lube oil line 23 leads downstream to the lube oil valve 14, which regulates a secondary system pressure $P_{sys2}$ in the secondary circuit (or lube oil circuit/cooling oil circuit) of the hydraulic system 1.

Adjacent thereto and spaced apart therefrom in the second direction x2 are the third valve collar 16.3, the third valve pocket 17.3, and a third port 19.3 and a fourth port 19.4. The third port 19.3 is a pressure inlet, which is connected to the first pressure outlet 6 of the pump system 5. The fourth port 19.4 is a pressure outlet, which is connected to the system pressure line 11, within which a primary system pressure $P_{sys1}$ prevails, the primary system pressure $P_{sys1}$ being regulated by the system pressure valve 8.

Adjacent thereto and spaced apart therefrom in the second direction x2 are the fourth valve collar 16.4, the fourth valve pocket 17.4 and a fifth port 19.5. The fifth port 19.5 is a pressure outlet and is connected to the lube oil line 23, which leads downstream to the lube oil valve 14.

Adjacent thereto and spaced apart therefrom in the second direction x2 are the fifth valve collar 16.5, the fifth valve pocket 17.5, and the sixth port 19.6 and the seventh port 19.7. The sixth port 19.6 is a pressure inlet, which is connected to the second pressure outlet 7 of the pump system 5. The seventh port 19.7 is a pressure outlet, which is connected to the system pressure line 11, within which the primary system pressure $P_{sys1}$ prevails, the primary system pressure $P_{sys1}$ being regulated by the system pressure valve 8.

Adjacent thereto and spaced apart therefrom in the second direction x2 are the sixth valve collar 16.6, the sixth valve pocket 17.6 and the eighth port 19.8. The eighth port 19.8 is a pressure outlet and is connected via an orifice to a pressureless tank T.

Finally, adjacent thereto and spaced apart therefrom in the second direction x2, the seventh valve collar 16.7, the seventh valve pocket 17.7 and a ninth port 19.9 are arranged in the area of a second end face S2 of the system pressure valve 8. The ninth port 19.9 is a pressure inlet and is connected via an orifice 25 to the first pressure inlet 6 of the pump system 5.

The valve slide 9 has a piston rod 27. Multiple pistons 29, 28, 30 and 31 are arranged on the piston rod 27. The individual pistons 29, 30, 31 and 31 are connected, more particularly fixedly connected, to the piston rod 27. The pistons 28, 29, 30 and 31 extend further outwards in the radial direction r of the valve slide 9 than the piston rod 27. The diameters of the pistons 28, 29, 30 and 31 are selected such that the pistons 28, 29, 30 and 31 can be moved back and forth in the longitudinal direction L within the longitudinal hole 18 of the valve housing 8 and, in fact, more particularly, in a (largely) sealing and frictionless manner. The valve pockets 17.1 through 17.7 in turn extend further outwards in the radial direction r of the valve slide 27 than the pistons 28, 29, 30 and 31.

A first piston 28 is arranged in the area of the first face end S1. In addition, a second piston 29 is arranged adjacent to the first piston 28 and at an axial distance from the first piston 29 in the second direction x2. Moreover, a third piston 30 is arranged adjacent to the second piston 29 and at an axial distance from the second piston 29 in the second direction x2. Finally, a fourth piston 31 is arranged adjacent to the third piston 30 in the area of the second end face S2.

The first piston 28 seals off the first valve pocket 17.1 with respect to the second valve pocket 17.2 regardless of the position of the valve slide 9 in relation to the valve housing 10, and so there is no direct connection between the first valve pocket 17.1 and the second valve pocket 17.2. As a result, the first port 19.1 is not connected to the second port 19.2 either. Similarly, the second piston 29 seals off the third valve pocket 17.3 from the fourth valve pocket 17.4 regardless of the position of the valve slide 9 in relation to the valve housing 10, and so the third valve pocket 17.3 is not connected to the fourth valve pocket 17.4, and so neither the third port 19.3 nor the fourth port 19.4 is connected to the fifth port 19.5. Moreover, the third piston 30 seals off the fifth valve pocket 17.5 from the sixth valve pocket 17.6 regardless of the position of the valve slide 9 in relation to the valve housing 10, and so the fifth valve pocket 17.5 is not connected to the sixth valve pocket 17.6, and so neither the sixth port 19.6 nor the seventh port 19.7 is connected to the eighth port 19.8. In addition, the fourth piston 31 seals off the sixth valve pocket 17.6 from the seventh valve pocket 17.7 regardless of the position of the valve slide 9 in relation to the valve housing 10, and so the sixth valve pocket 17.6 is not connected to the seventh valve pocket 17.7, and so the eighth port 19.8 is not connected to the ninth port 19.9.

The feature "connected" is understood to mean, more particularly, that the particular interconnected elements are connected to each other in a hydraulically conductive manner, i.e., oil can flow from the one element to the other element and, if necessary, vice versa. The feature "disconnects", "disconnected" or "not connected", however, can be understood to mean, more particularly, that the particular elements that are disconnected from each other are not connected to each other in a hydraulically conductive manner, i.e., no oil (e.g., absent inherent leakage) can flow from the one element to the other element and, if necessary, vice versa.

The first piston 28 is cup-shaped and forms an interior space 32 as well as an inner pressure surface 33, which extends in the radial direction r (and, therefore, transversely to the longitudinal axis L and to the axial directions x1, x2).

The spring element 15 generates a mechanical preload force, which acts in the second direction x2 on the inner pressure surface 33 of the first piston 28. The first valve pocket 17.1 is connected to the interior space 32 of the first piston 28 via the longitudinal bore 18. The spring element 15 mechanically preloads the system pressure valve slide 9 in a first switching position. When the system pressure valve slide 9 is in the first switching position, the fourth piston 31 impacts an end-face end of the valve housing 10 in the second axial direction x2 in the area of the seventh valve pocket 17.7. The system pressure valve slide 9, more particularly, always assumes this defined first switching position when the hydraulic system 1 is switched to a pressureless condition, and therefore the first switching position can also be referred to as a basic position of the system pressure valve 8.

The mechanical preload force of the spring element 15 can be boosted by a hydraulic pilot pressure, which is generated by the pilot valve 22. A pressure inlet of the pilot valve 22 can be connected to the primary circuit 11 in order to supply the pilot valve 22 with pressurized oil. The pilot valve 22 outputs the hydraulic pilot pressure, from which a hydraulic pilot force results, the hydraulic pilot force acting upon the system pressure valve slide 9 in the same direction as the mechanical preload force of the spring element 15, and so the hydraulic pilot force boosts the mechanical preload force. The pilot valve 22 can have, for example, a pressure-current characteristic curve with a falling gradient, and so the pilot valve 22 supplies, via the pressure outlet 24, the maximally possible hydraulic pilot pressure into the pilot pressure line 20 when an electromagnetic actuator of the pilot valve 22 is not energized. This is more particularly the case when, during an activation of a mechanical emergency operation of the automatic transmission 2, a current or voltage supply to the electronic transmission control unit 35 is switched off.

When the system pressure valve slide 9 is in the first switching position, the first piston 28 seals off the second valve pocket 17.2 from the third valve pocket 17.3, and so the second valve pocket 17.2 is not connected to the third valve pocket 17.3, and so the second port 19.2 is connected neither to the third port 19.3 nor to the fourth port 19.4. In this way, hydraulic fluid, which is pumped from the pump system 5, output via the first pressure outlet 6 of the pump system 5 and applied at the third port 19.3, is directed via the third valve pocket 17.3, the longitudinal bore 18 and the fourth port 19.4 of the system pressure valve 8 exclusively into the primary circuit 11 and not into the secondary circuit 12 when the system pressure valve slide 9 is in the first switching position.

When the system pressure valve slide 9 is in the first switching position, the second piston 29, furthermore, seals off the fourth valve pocket 17.4 from the fifth valve pocket 17.5, and so the fourth valve pocket 17.4 is not connected to the fifth valve pocket 17.3, and so the fifth port 19.5 is connected neither to the sixth port 19.6 nor to the seventh port 19.7. In this way, hydraulic fluid, which is pumped from the pump system 5 and output via the second pressure outlet 7 of the pump system 5, is directed via the sixth port 19.6, the fifth valve pocket 17.5, the longitudinal bore 18 and the seventh port 19.7 of the system pressure valve 8 exclusively into the primary circuit 11 and not into the secondary circuit 12 when the system pressure valve slide 9 is in the first switching position.

Due to the fact that no hydraulic fluid pumped from the pump system 5 and output via the two pressure outlets 6, 7 of the pump system 5 flows via the system pressure valve 8 into the secondary circuit 12, but rather exclusively into the primary circuit 11, the system pressure valve 8 sets a maximum primary system pressure $P_{sys1}$ in the primary circuit 11 when the system pressure valve slide 9 is in the first switching position. The primary system pressure is used, more particularly, for engaging the shift elements A through E as well as K0 and WK.

When the pump system 5 pumps hydraulic fluid into the hydraulic system 1, a pressure arises, which can be regulated via the system pressure valve 8. As mentioned above, the ninth port 19.9 of the system pressure valve 8 is connected via an orifice 25 to the first pressure outlet 6 of the pump system 5. Essentially, this pressure regulation functions in such a way that a pump pressure generated by the first pressure outlet 6 of the pump system 5 is fed via the orifice 25 and the ninth port 19.9 of the seventh valve pocket 17.7 to the longitudinal bore 18 and, there, acts upon an end-face pressure surface 36 of the system pressure valve slide 9. This feedback of the pump pressure results in a feedback force, which counters the mechanical preload force of the spring element 15 and the hydraulic pilot force of the pilot valve 22. The feedback force therefore acts upon the system pressure valve slide 9 such that the system pressure valve slide 9 tends to move toward an end stop on the first end face S1. When the system pressure valve slide 9 is in the end stop, the first piston 28 impacts an end-face end of the valve housing 8 in the first axial direction x1 in the area of the first valve pocket 17.1 on the spring side.

On a path from the first switching position into the end stop, the system pressure valve slide 9 assumes a second switching position and a third switching position, wherein the first piston 28 and the second piston 29 pass over the second valve pocket 17.2 and the fourth valve pocket 17.4, respectively, via which an excess hydraulic fluid volume can be drained and therefore the primary system pressure $P_{sys1}$ in the regulated primary system pressure circuit can be vented and reduced.

In detail, when the system pressure valve slide 9 is in the second switching position, the first piston 28 (as in the first switching position as well and shown in FIG. 1) seals off the second valve pocket 17.2 from the third valve pocket 17.3, and so the second valve pocket 17.2 is not connected to the third valve pocket 17.3, and so the second port 19.2 is connected neither to the third port 19.3 nor to the fourth port 19.4. In this way, hydraulic fluid, which is pumped from the pump system 5 and output via the first pressure outlet 6 of the pump system 5, is directed via the third port 19.3, the third valve pocket 17.3, the longitudinal bore 18 and the fourth port 19.4 of the system pressure valve 8 exclusively into the primary circuit 11 and not into the secondary circuit 12 when the system pressure valve slide 9 is in the second switching position.

However, when the system pressure valve slide 9 is in the second switching position, the second piston 29 now opens (unlike the case in the first switching position) the fourth valve pocket 17.4 with respect to the fifth valve pocket 17.5, and so the fourth valve pocket 17.4 is connected to the fifth valve pocket 17.5 (as shown in FIG. 1), and so the fifth port 19.5 is now connected, more particularly, to the sixth port 19.6. In this way, on the one hand, a first portion of the hydraulic fluid, which is pumped from the pump system 5 and output via the second pressure outlet 7 of the pump system 5, is directed via the sixth port 19.6, the fifth valve pocket 17.5, the longitudinal bore 18 and the seventh port 19.7 of the system pressure valve 8 into the primary circuit 11 when the system pressure valve slide 9 is in the second switching position. On the other hand, a second portion of the hydraulic fluid, which is pumped from the pump system 5 and output via the second pressure outlet 7 of the pump system 5, is directed via the sixth port 19.6, the fifth valve pocket 17.5, the longitudinal bore 18 and the fifth port 19.5 of the system pressure valve 8 into the secondary circuit 12 when the system pressure valve slide 9 is in the second switching position.

When the system pressure valve slide 9 moves from the second switching position further toward the end stop and thereby assumes the third switching position, the first piston now opens (unlike the case in the first and the second switching positions) the second valve pocket 17.2 with respect to the third valve pocket 17.3, and so the second valve pocket 17.2 is connected to the third valve pocket 17.3, and so the second port 19.2 is connected, more particularly, to the third port 19.3. In this way, on the one hand, a first portion of the hydraulic fluid, which is pumped from the pump system 5 and output via the first pressure outlet 6 of the pump system 5, is directed via the third port 19.3, the third valve pocket 17.3, the longitudinal bore 18 and the fourth port 19.4 of the system pressure valve 8 into the primary circuit 11 when the system pressure valve slide 9 is in the third switching position. On the other hand, a second portion of the hydraulic fluid, which is pumped from the pump system 5 and output via the first pressure outlet 6 of the pump system 5, is directed via the third port 19.3, the third valve pocket 17.3, the longitudinal bore 18 and the second port 19.2 of the system pressure valve 8 into the secondary circuit 12 when the system pressure valve slide 9 is in the third switching position. The second piston 29 opens (as in the above-described second switching position, although now with a larger opening cross-section), furthermore, the fourth valve pocket 17.4 with respect to the fifth valve pocket 17.5 when the system pressure valve slide 9 is in the third switching position, and so even more hydraulic fluid is pumped into the lubrication pressure line 23 when the system pressure valve slide 9 is in the third switching position (as compared to the second switching position). In order to vary the level of the primary system pressure $P_{sys1}$, the pilot pressure in the first valve pocket 17.1 on the spring side can be varied via the pilot valve 9 via the hydraulic pilot pressure line 21.

In the exemplary embodiment shown in FIG. 1, the second piston 29 has a first diameter $d_1$ and the third piston 30 has a second diameter $d_2$. The first diameter $d_1$ is slightly larger than the second diameter $d_2$. For example, the first diameter can be one millimeter (1 mm) larger than the second diameter $d_2$. Due to this difference in diameter $\Delta d$ (in the aforementioned example, $\Delta d = d_1 - d_2 = 1$ mm), a first radial pressure application area 26 of the second piston 29 is larger than a second radial pressure application area 34 of the third piston 30.

The pressure output by the second pressure outlet 7 of the pump system 5 acts as secondary pump pressure $P_{Psek}$ on the first radial pressure application area 26 of the second piston 29 and on the second radial pressure application area 34 of the third piston 30. Since the radial pressure application area 26 of the second piston 29 is larger than the radial pressure application area 34 of the third piston 30, the secondary pump pressure $P_{Psek}$ results in a displacement force, which acts upon the first radial pressure application area 26 of the second piston 29 in the first axial direction x1. This displacement force counters the mechanical preload force of the spring element 15 and the hydraulic pilot force of the pilot valve 22. Therefore, the feedback force (on the end-face pressure surface 36) and the displacement force (on the first radial pressure application pressure 26) act upon the system pressure valve slide 9 in the first axial direction $x_1$.

By contrast, the mechanical preload force of the spring element 15 and the hydraulic pilot force of the pilot valve 22 (on the inner pressure surface 33 of the first piston 28) act upon the system pressure valve slide 9 in the second axial direction $x_2$.

The displacement force acting upon the first radial pressure application area 26 of the second piston 29 of the system pressure valve slide 9 in the first axial direction $x_1$ increases the feedback force acting upon the system pressure valve slide 9 in the same direction x1 when the secondary flow of the pump system 5 is acted upon by high pressure and a correspondingly high secondary pressure $P_{Psek}$ is output via the second pressure outlet 7 of the pump system 5. When the secondary flow is reduced to low pressure, the secondary pressure $P_{Psek}$ output via the second pressure outlet 7 of the pump system 5 is correspondingly reduced, and so the displacement force is correspondingly reduced. This change in the displacement force as a function of the pressure condition of the secondary flow of the pump system 5 results in a stabilization of the hydraulic system 1, i.e., the hydraulic system 1 is less susceptible to toggling.

Figure 3:
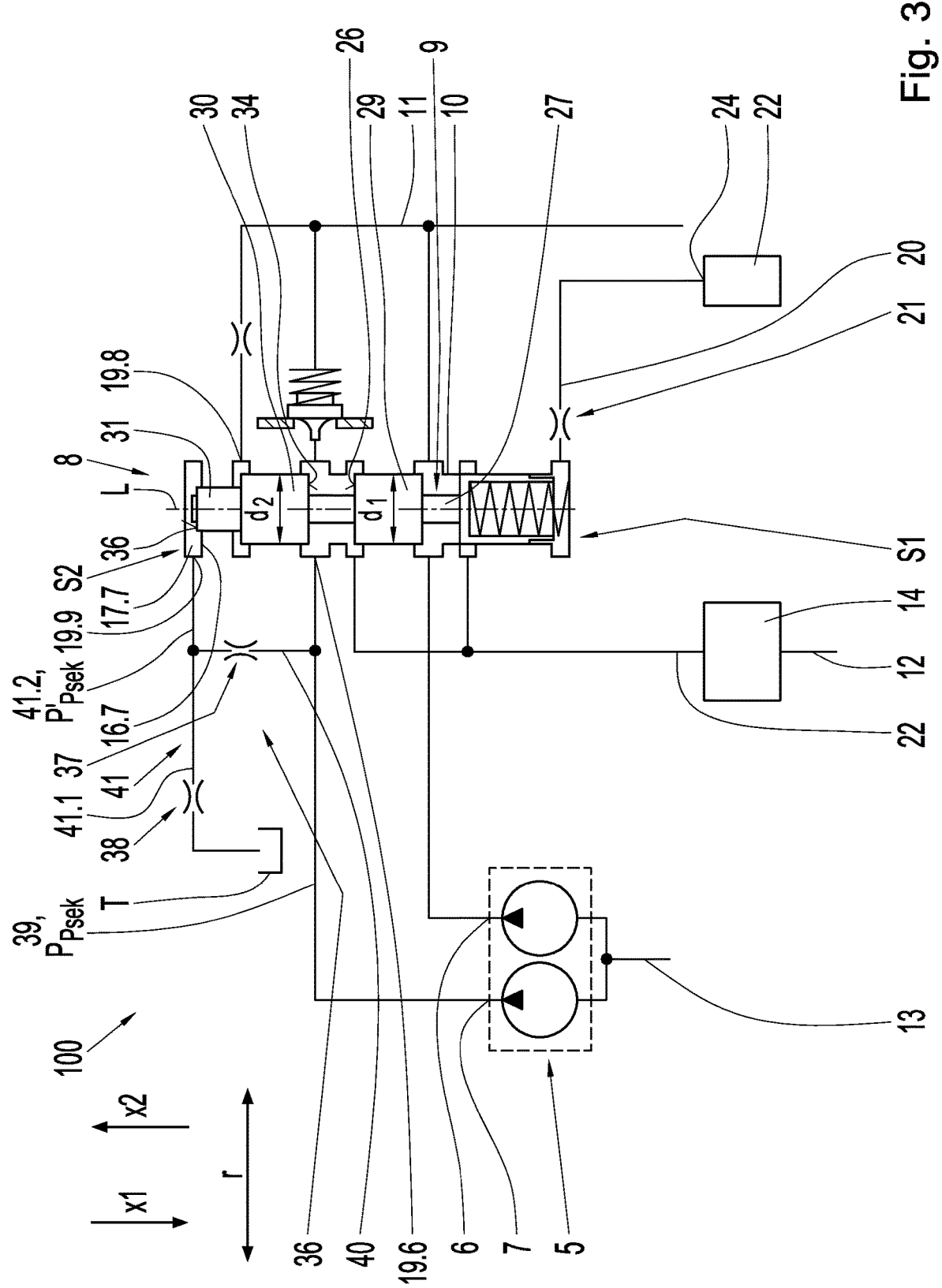
FIG. 3 shows a hydraulic circuit diagram of a second exemplary embodiment of a hydraulic system according to example aspects of the invention for an automatic transmission of a motor vehicle.

FIG. 3 shows a second hydraulic system 100, which is designed similarly to the hydraulic system 1 from FIG. 1. FIG. 3 shows only a portion of the entire hydraulic system, which is designed to actuate multiple shift elements (brakes and/or clutches; not shown) of the automatic transmission 2. The hydraulic system 100 includes, more particularly, a pump system 5 that has a first pressure outlet 6 and a second pressure outlet 7. The pump system 5 from FIG. 3 is identically designed and performs the same function as the pump system 5 from FIG. 1. In addition, the hydraulic system 100 includes, more particularly, a system pressure valve 8 having a system pressure valve slide 9 and having a valve housing 10. Moreover, the hydraulic system 1 has a primary circuit 11, a secondary circuit 12 and a tertiary circuit 13, which can be identically designed and perform the same functions as described in conjunction with FIG. 1.

The system pressure valve 8 from FIG. 3 is designed to be essentially identical to the system pressure valve 8 from FIG. 1, wherein only the differences will be dealt with in the following to avoid repetition. The second piston 29 of the piston rod 27 of the system pressure valve slide 9 from FIG. 3 has a first diameter $d_1$, which is the same size as a second diameter $d_2$ of the third piston 30 of the piston rod 27 of the system pressure valve slide 9. Therefore, the first radial pressure application surface 26 of the second piston 29 is also the same size as the second radial pressure application surface 34 of the third piston 30. In addition, the eighth port 19.8 is also a pressure outlet. However, the eighth port 19.8 is not connected via an orifice to a pressureless tank T (cf. FIG. 1), but rather to the primary circuit 11.

Instead of protecting the hydraulic system 100 from toggling by a difference in diameter $\Delta d$ at the pistons 29, 30 of the piston rod 27 of the system pressure valve slide 9 (cf. FIG. 1), in the exemplary embodiment from FIG. 3, the secondary pressure of the pump system 5 is directed via a first hydraulic pressure splitter circuit 36 onto the end-face pressure surface 36 of the fourth piston 31 of the piston rod 27 of the system pressure valve slide 9. The first hydraulic pressure splitter circuit 36 includes a first pressure splitter orifice 37 and a second pressure splitter orifice 38. The first pressure splitter orifice 37 has a diameter of a half millimeter (0.5 mm) in the exemplary embodiment shown. The second pressure splitter orifice 38 in the exemplary embodiment shown has a diameter of one and two-tenths millimeter (1.2 mm) and, therefore, is larger than the diameter of the first pressure splitter orifice 37.

The second pressure outlet 7 of the pump system 5 is connected to the sixth port 19.6 (pressure inlet) of the system pressure valve 8 via a secondary pressure line 39. A first pressure splitter line 40 branches off from the secondary pressure line 39 between the second pressure outlet 7 of the pump system 5 and the sixth port 19.6 of the system pressure valve 8. In addition, a second pressure splitter line 41 branches off from the first pressure splitter line 40. The first pressure splitter orifice 37 is arranged within the first pressure splitter line 40. A first section 41.1 of the second pressure splitter line 41 is connected to the pressureless tank T, wherein the second pressure splitter orifice 38 is arranged within the first section 41.1 of the second pressure splitter line 41. A second port 41.2 of the second pressure splitter line 41 is connected to the ninth port 19.9 (pressure inlet) of the system pressure valve 8.

The secondary pump pressure $P_{Psek}$ output by the second pressure outlet 7 of the pump system 5 is reduced to a reduced secondary pump pressure $P'_{Psek}$ by the hydraulic pressure splitter circuit 36. The extent of this pressure reduction can be set via the ratio of the diameters of the two pressure splitter orifices 37, 38. The reduced secondary pump pressure $P'_{Psek}$ prevails in the second section 41.2 of the second pressure splitter line 41 and is applied at the ninth port 19.9 of the system pressure valve 8. The reduced secondary pump pressure $P'_{Psek}$ is fed via the ninth port 19.9 of the seventh valve pocket 17.7 to the longitudinal bore 18 and, there, acts upon the end-face pressure surface 36 of the system pressure valve slide 9. This feedback of the reduced pump pressure $P'_{Psek}$ results in the damped feedback force, which counters the mechanical preload force of the spring element 15 and the hydraulic pilot force of the pilot valve 22.

The feedback force therefore acts upon the system pressure valve slide 9 such that the system pressure valve slide 9 tends to move toward an end stop on the first end face S1. Therefore, the damped feedback force (on the end-side pressure surface 36) acts upon the system pressure valve slide 9 in the first axial direction $x_1$. By contrast, the mechanical preload force of the spring element 15 and the hydraulic pilot pressure of the pilot valve 22 (on the inner pressure surface 33 of the first piston 28) act upon the system pressure valve slide 9 in the second axial direction $x_2$. In the approach shown by FIG. 3, an additional leakage arises in the hydraulic system 100 toward the tank T via the second pressure splitter orifice 38. This leakage increases the primary demand when the secondary flow is switched to high pressure and, after the pressure reduction, the secondary demand.

Figure 4:
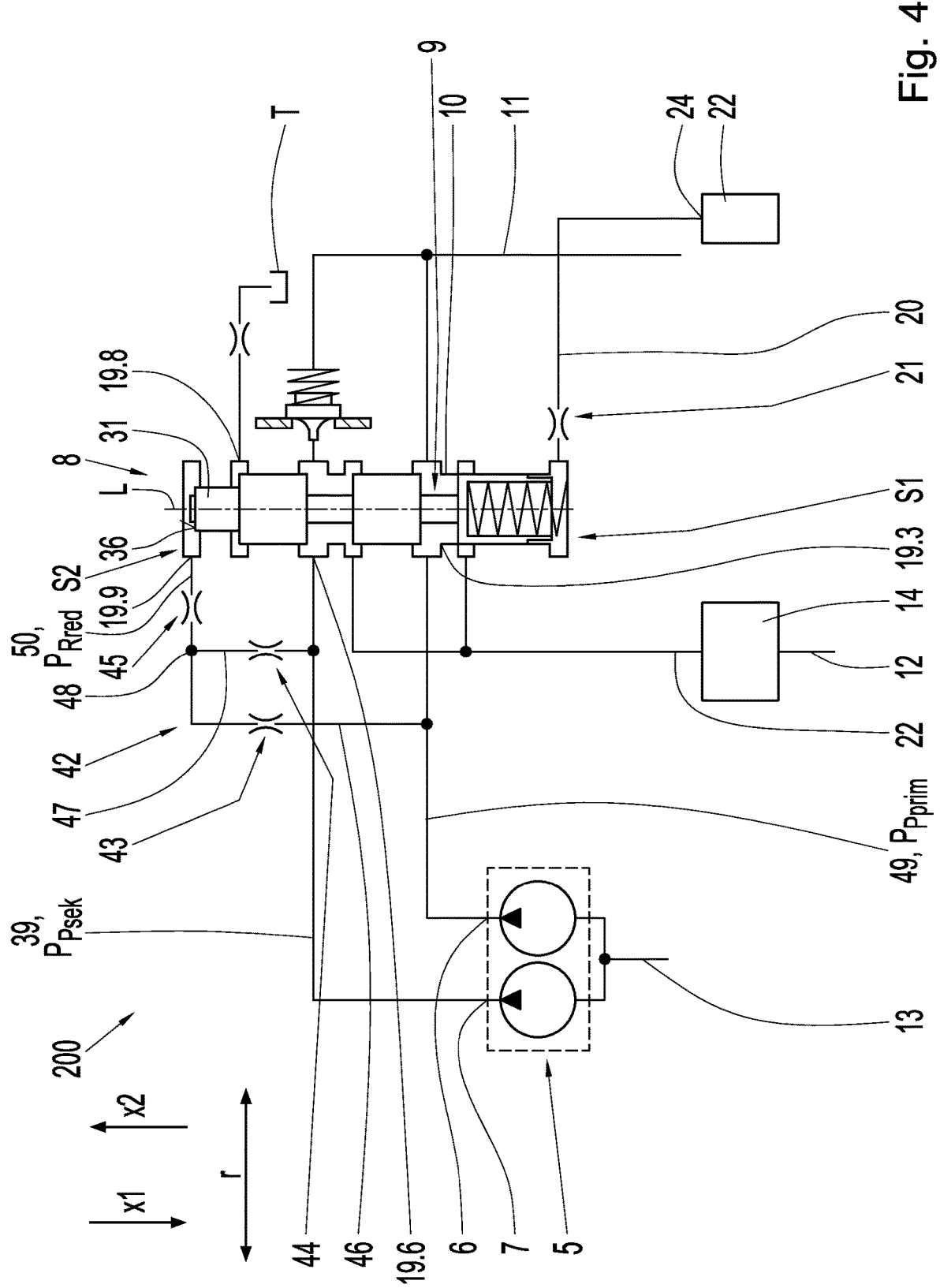
FIG. 4 shows a hydraulic circuit diagram of a third exemplary embodiment of a hydraulic system according to example aspects of the invention for an automatic transmission of a motor vehicle.

FIG. 4 shows a third hydraulic system 300, which solves this problem. The hydraulic system 200 from FIG. 4 is designed similarly to the second hydraulic system 100 from FIG. 3. FIG. 4 shows only a portion of the entire hydraulic system, which is designed to actuate multiple shift elements (brakes and/or clutches; not shown) of the automatic transmission 2. The hydraulic system 200 includes, more particularly, a pump system 5 that has a first pressure outlet 6 and that has a second pressure outlet 7. The pump system 5 from FIG. 3 is identically designed and performs the same function as the pump systems 5 from FIGS. 1 and 3. In addition, the hydraulic system 200 includes, more particularly, a system pressure valve 8 having a system pressure valve slide 9 and having a valve housing 10. Moreover, the hydraulic system 200 has a primary circuit 11, a secondary circuit 12 and a tertiary circuit 13, which can be identically designed and perform the same functions as described in conjunction with FIGS. 1 and 3. The system pressure valve 8 from FIG. 4 is designed identically to the system pressure valve 8 from FIG. 8, wherein some of the ports of the system pressure valve 8 are connected differently. In the following, only the differences from the exemplary embodiment from FIG. 3 are dealt with, in order to avoid repetitions.

The eighth port 19.8 (pressure outlet) of the system pressure valve 8 (as in the exemplary embodiment from FIG. 1) is connected to the pressureless tank via an orifice. In addition, in the exemplary embodiment from FIG. 4, a primary pressure and a secondary pressure of the pump system 5 are directed via a second hydraulic pressure splitter circuit 42 onto an end-face pressure surface 36 of the fourth piston 31 of the piston rod 27 of the system pressure valve slide 9. The second hydraulic pressure splitter circuit 42 includes a first pressure splitter orifice 43, a second pressure splitter orifice 44 and a third pressure splitter orifice 45. The first pressure splitter orifice 43 has a diameter of one and two-tenths millimeter (1.2 mm) in the exemplary embodiment shown. The second pressure splitter orifice 44 in the exemplary embodiment shown has a diameter of six-tenths millimeter (0.6 mm) and, therefore, is smaller than the diameter of the first pressure splitter orifice 43. The third pressure splitter orifice 45 in the exemplary embodiment shown has a diameter of one millimeter (1.0 mm) and, therefore, is larger than the diameter of the second pressure splitter orifice 44 and is smaller than the diameter of the first pressure splitter orifice 43.

The first pressure outlet 6 of the pump system 5 is connected to the third port 19.3 (pressure inlet) of the system pressure valve 8 via a primary pressure line 49. A first pressure splitter line 46 branches off from the primary pressure line 49 between the first pressure outlet 6 of the pump system 5 and the third port 19.3 of the system pressure valve 8. The first pressure splitter orifice 43 is arranged within the first pressure splitter line 46. The first pressure splitter line 46 is connected at a node 48 to a second pressure splitter line 47 and to a third pressure splitter line 50. The third pressure splitter line 50 leads to the ninth port 19.9 of the system pressure valve 8. The third pressure splitter orifice 45 is arranged within the third pressure splitter line 50.

The second pressure outlet 7 of the pump system 5 is connected (as in the exemplary embodiment from FIG. 3) to the sixth port 19.6 (pressure inlet) of the system pressure valve 8 via a secondary pressure line 39. The second pressure splitter line 47 branches off from the secondary pressure line 39 between the second pressure outlet 7 of the pump system 5 and the sixth port 19.6 of the system pressure valve 8. The second pressure splitter orifice 44 is arranged within the second pressure splitter line 47. The third pressure splitter line 50 branches off from the second pressure splitter line 47 at the node 48. The third pressure splitter line 50 is connected to the ninth port 19.9 (pressure inlet) of the system pressure valve 8.

The primary pump pressure $P_{Pprim}$ output by the first pressure outlet 6 of the pump system 5 is reduced by the hydraulic pressure splitter circuit 42. The same applies for the secondary pump pressure $P_{Psek}$ output by the second pressure outlet 7 of the pump system 5. The extent of this pressure reduction can be set via the ratio of the diameters of the three pressure splitter orifices 43, 44, 45. The two reduced pressures are combined in the third pressure splitter line 50 upstream from the ninth inlet 19.9 of the system pressure valve 8 to form a common reduced feedback pressure $P_{Rred}$. The common reduced feedback pressure $P_{Rred}$ prevails in the third pressure splitter line 50 and is applied at the ninth port 19.9 of the system pressure valve 8. The common reduced feedback pressure $P_{Rred}$ is fed via the ninth port 19.9 of the seventh valve pocket 17.7 to the longitudinal bore 18 and, there, acts upon the end-face pressure surface 36 of the system pressure valve slide 9. This feedback of the common reduced feedback pressure $P_{Rred}$ results in a damped feedback force, which counters the mechanical preload force of the spring element 15 and the hydraulic pilot force of the pilot valve 22.

The feedback force therefore acts upon the system pressure valve slide 9 such that the system pressure valve slide 9 tends to move toward an end stop on the first end face S1. Therefore, the feedback force (on the end-side pressure surface 36) acts upon the system pressure valve slide 9 in the first axial direction $x_1$. By contrast, the mechanical preload force of the spring element 15 and the hydraulic pilot pressure of the pilot valve 22 (on the inner pressure surface 33 of the first piston 28) act upon the system pressure valve slide 9 in the second axial direction $x_2$. In the approach shown by FIG. 4, the dependence of the secondary pressure $P_{Psek}$ on the axial feedback force at the system pressure valve slide 9 is achieved by reducing the primary pump pressure $P_{Pprim}$ of the primary circuit of the pump system 5 as soon as the secondary pump pressure $P_{Psek}$ is reduced to low pressure. The advantage of the hydraulic system 200 from FIG. 4 is, more particularly, that the leakage (in comparison to the hydraulic system 100 from FIG. 3) arises only when the secondary pump pressure $P_{Psek}$ has been reduced to low pressure (previously, both circuits to high pressure) and, thereafter, oil does not flow into the tank T, but rather is fed to the secondary circuit 12. As a result, the oil is not lost unused.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS $d_1$ diameter of the second piston
$d_2$ diameter of the third piston
L longitudinal axis of system pressure valve
r radial direction of valve housing
$P_{Psek}$ secondary pressure of the pump system
$P'_{Psek}$ reduced secondary pressure of the pump system
$P_{Rred}$ common reduced feedback pressure
$P_{sys1}$ primary system pressure
$P_{sys2}$ secondary system pressure
S1 first end face of system pressure valve
S2 second end face of system pressure valve
T oil sump/pressureless tank
x1 first axial direction
x1 second axial direction
1 hydraulic system
2 automatic transmission
3 motor vehicle
4 prime mover
4.1 internal combustion engine
4.2 electric machine
5 pump system
6 first pressure outlet of pump system
7 second pressure outlet of pump system
8 system pressure valve
9 system pressure valve slide
10 valve housing
11 primary circuit
12 secondary circuit
13 tertiary circuit
14 lubricating valve
15 spring element
16.1 first valve collar
16.2 second valve collar
16.3 third valve collar
16.4 fourth valve collar
16.5 fifth valve collar
16.6 sixth valve collar
16.7 seventh valve collar
17.1 first valve pocket
17.2 second valve pocket
17.3 third valve pocket
17.4 fourth valve pocket
17.5 fifth valve pocket
17.6 sixth valve pocket
17.7 seventh valve pocket
18 longitudinal bore of valve housing
19.1 first connection of system pressure valve
19.2 second connection of system pressure valve
19.3 third connection of system pressure valve
19.4 fourth connection of system pressure valve
19.5 fifth connection of system pressure valve
19.6 sixth connection of system pressure valve
19.7 seventh connection of system pressure valve
19.8 eighth connection of system pressure valve
19.9 ninth connection of system pressure valve
20 pilot pressure line
21 pilot pressure orifice
22 pilot valve
23 lube oil line
24 pressure outlet of pilot valve
25 orifice
26 first radial pressure application area
27 piston rod
28 first piston
29 second piston
30 third piston
31 fourth piston
32 interior space of first piston
33 interior pressure surface of first piston
34 second radial pressure application area
35 first hydraulic pressure splitter circuit
36 end-face pressure surface of system pressure valve slide
37 first pressure splitter orifice of the first hydraulic pressure splitter circuit
38 second pressure splitter orifice of the first hydraulic pressure splitter circuit
39 secondary pressure line
40 first pressure splitter line of the first hydraulic pressure splitter circuit
41 second pressure splitter line of the first hydraulic pressure splitter circuit
41.1 first section of the second pressure splitter line
41.2 second section of the second pressure splitter line
42 second hydraulic pressure splitter circuit
43 first pressure splitter orifice of the second hydraulic pressure splitter circuit 44 second pressure splitter orifice of the second hydraulic pressure splitter circuit
45 third pressure splitter orifice of the second hydraulic pressure splitter circuit
46 first pressure splitter line of the second hydraulic pressure splitter circuit
47 second pressure splitter line of the second hydraulic pressure splitter circuit
48 node
49 primary pressure line
50 third pressure splitter line of the second hydraulic pressure splitter circuit

The invention claimed is:

1. A hydraulic system (1; 100; 200) for a transmission (2) of a motor vehicle (3), comprising:
a pump system (5) with a first pressure outlet (6) and a second pressure outlet (7);
a primary circuit (11);
a secondary circuit (12); and
a system pressure valve (8) with a system pressure valve slide (9),
wherein the hydraulic system (1; 100; 200) is configured such that a secondary pump pressure (PPsek) output from the second pressure outlet (7) of the pump system (5) is fed to a radial pressure surface (26; 36) of the system pressure valve slide (9), and therefore an axial load based on the secondary pump pressure (PPsek) acts upon the radial pressure surface (26; 36) of the system pressure valve slide (9) such that the system pressure valve slide (9) is urged counter to a mechanical preload force out of a first switching position into a second switching position,
wherein the system pressure valve slide (9) comprises two adjacent pistons (29, 30) having different diameters (d1, d2),
wherein the pistons (29, 30) are spaced apart from each other in an axial direction (x1) of the system pressure valve slide (9),
wherein the piston (29) with a greater diameter (d1) forms the radial pressure surface (26) of the system pressure valve slide (9), and
wherein the axial load based on the secondary pump pressure (PPsek) acts upon the radial pressure surface (26) of the piston (29) with the greater diameter (d1) such that the system pressure valve slide (9) is urged counter to the mechanical preload force out of the first switching position into the second switching position.

2. The hydraulic system (1; 100; 200) of claim 1, wherein the hydraulic system (1; 100; 200) is configured such that:
hydraulic fluid pumped from the pump system (5) via the first two pressure outlets (6, 7) of the pump system (5) is directed via the system pressure valve (8) exclusively into the primary circuit (11), and therefore a first primary system pressure (Psys1) prevails in the primary circuit (11) when the system pressure valve slide (9) is in the first switching position;
hydraulic fluid pumped from the pump system (5) via the first two pressure outlets (6, 7) of the pump system (5) is directed via the system pressure valve (8) into the primary circuit (11), and, in order to reduce the primary system pressure (Psys1), a portion of the hydraulic fluid pumped from the pump system (5) via the second pressure outlet (7) of the pump system (5) is directed via the system pressure valve (8) into the secondary circuit (12) when the system pressure valve slide (9) is in the second switching position.

3. The hydraulic system (1) of claim 1, wherein the piston (29) with the greater diameter (d1) is arranged, in the axial direction (x1) of the system pressure valve (8), with a smaller distance to a spring (15) that generates the mechanical preload force relative to the other piston (30) with a lesser diameter (d2).

4. The hydraulic system (1) of claim 3, wherein the diameters (d1, d2) of the two pistons (29, 30) differ by no more than a tenth of a millimeter.

5. The hydraulic system (100) of claim 1, further comprising a first hydraulic pressure splitter circuit (36), wherein the axial load based on the secondary pump pressure (PPsek) is conducted via the first hydraulic pressure splitter circuit (36) onto the radial pressure surface (36) of the system pressure valve slide (9).

6. The hydraulic system (200) of claim 1, further comprising a hydraulic pressure splitter circuit (42), wherein:
the axial load varies with the secondary pump pressure (PPsek) and a primary pump pressure (PPprim); and
the secondary pump pressure (PPsek) and the primary pump pressure (PPprim) are reduced by the hydraulic pressure splitter circuit (42) to a common feedback pressure (PRred) that is applied to the radial pressure surface (36) of the system pressure valve slide (9).

7. The hydraulic system (200) of claim 6, wherein:
the hydraulic pressure splitter circuit (42) comprises a first pressure splitter line (46) connected to the first pressure outlet (6) of the pump system (5), a first pressure splitter orifice (43) arranged within the first pressure splitter line (46);
the hydraulic pressure splitter circuit (42) comprises a second pressure splitter line (47) connected to the second pressure outlet (7) of the pump system (5), a second pressure splitter orifice (44) arranged within the second pressure splitter line (47);
the hydraulic pressure splitter circuit (42) comprises a third pressure splitter line (50) connected to the first pressure splitter line (46) and to the second pressure splitter line (47), a third pressure splitter orifice (45) arranged within the third pressure splitter line (50);
the third pressure splitter line (50) is connected to a pressure inlet (19.9) of the system pressure valve (8); and
the radial pressure surface (36) is formed by a piston (31) of the system pressure valve slide (9) arranged on an end face of the system pressure valve slide (9) and is acted upon by the reduced common feedback pressure (PRred) via the pressure inlet (19.9) of the system pressure valve (8).

8. A hydraulic system (1; 100; 200) for a transmission (2) of a motor vehicle (3), comprising:
a pump system (5) with a first pressure outlet (6) and a second pressure outlet (7);
a primary circuit (11);
a secondary circuit (12);
a first hydraulic pressure splitter circuit (36); and
a system pressure valve (8) with a system pressure valve slide (9),
wherein the hydraulic system (1; 100; 200) is configured such that a secondary pump pressure (PPsek) output from the second pressure outlet (7) of the pump system (5) is fed to a radial pressure surface (26; 36) of the system pressure valve slide (9), and therefore an axial load based on the secondary pump pressure (PPsek) acts upon the radial pressure surface (26; 36) of the system pressure valve slide (9) such that the system pressure valve slide (9) is urged counter to a mechanical preload force out of a first switching position into a second switching position, wherein the axial load based on the secondary pump pressure (PPsek) is conducted via the first hydraulic pressure splitter circuit (36) onto the radial pressure surface (36) of the system pressure valve slide (9), wherein the hydraulic pressure splitter circuit (36) comprises two pressure splitter lines (40, 41), wherein a respective pressure splitter orifice (37, 38) arranged within each of the two pressure splitter lines (40, 41), wherein the secondary pump pressure (PPsek) is reduceable by the hydraulic pressure splitter circuit; and wherein the reduced secondary pump pressure (P'Psek) acts upon the radial pressure surface (36) that is formed by a piston (31) of the system pressure valve slide (9) arranged on an end face of the system pressure valve slide (9).

9. The hydraulic system (100) of claim 8, wherein:
one of the two pressure lines (41) is connected to a pressureless tank (T) and to a pressure inlet (19.9) of the system pressure valve (8); and
the radial pressure surface (36) is acted upon by the reduced secondary pump pressure (P'Psek) via the pressure inlet (19.9) of the system pressure valve (9).

10. The hydraulic system (1; 100; 200) of claim 8, wherein the hydraulic system (1; 100; 200) is configured such that:
hydraulic fluid pumped from the pump system (5) via the first two pressure outlets (6, 7) of the pump system (5) is directed via the system pressure valve (8) exclusively into the primary circuit (11), and therefore a first primary system pressure (Psys1) prevails in the primary circuit (11) when the system pressure valve slide (9) is in the first switching position;
hydraulic fluid pumped from the pump system (5) via the first two pressure outlets (6, 7) of the pump system (5) is directed via the system pressure valve (8) into the primary circuit (11), and, in order to reduce the primary system pressure (Psys1), a portion of the hydraulic fluid pumped from the pump system (5) via the second pressure outlet (7) of the pump system (5) is directed via the system pressure valve (8) into the secondary circuit (12) when the system pressure valve slide (9) is in the second switching position.

11. The hydraulic system (200) of claim 8, further comprising a hydraulic pressure splitter circuit (42), wherein:
the axial load varies with the secondary pump pressure (PPsek) and a primary pump pressure (PPprim); and
the secondary pump pressure (PPsek) and the primary pump pressure (PPprim) are reduced by the hydraulic pressure splitter circuit (42) to a common feedback pressure (PRred) that is applied to the radial pressure surface (36) of the system pressure valve slide (9).

12. The hydraulic system (200) of claim 11, wherein:
the hydraulic pressure splitter circuit (42) comprises a first pressure splitter line (46) connected to the first pressure outlet (6) of the pump system (5), a first pressure splitter orifice (43) arranged within the first pressure splitter line (46);
the hydraulic pressure splitter circuit (42) comprises a second pressure splitter line (47) connected to the second pressure outlet (7) of the pump system (5), a second pressure splitter orifice (44) arranged within the second pressure splitter line (47);
the hydraulic pressure splitter circuit (42) comprises a third pressure splitter line (50) connected to the first pressure splitter line (46) and to the second pressure splitter line (47), a third pressure splitter orifice (45) arranged within the third pressure splitter line (50);
the third pressure splitter line (50) is connected to a pressure inlet (19.9) of the system pressure valve (8); and
the radial pressure surface (36) is formed by a piston (31) of the system pressure valve slide (9) arranged on an end face of the system pressure valve slide (9) and is acted upon by the reduced common feedback pressure (PRred) via the pressure inlet (19.9) of the system pressure valve (8).

* * * * *